(12) United States Patent
Soute et al.

(10) Patent No.: US 11,179,645 B2
(45) Date of Patent: Nov. 23, 2021

(54) PORTABLE INTERACTIVE GAME UNIT AND A COMPUTER-IMPLEMENTED METHOD FOR A PORTABLE INTERACTIVE GAME UNIT

(71) Applicant: Picoo B.V., Eindhoven (NL)

(72) Inventors: Iris Anna Catharina Soute, Eindhoven (NL); Daniel Tetteroo, Eindhoven (NL)

(73) Assignee: Picoo B.V., Eindhoven (NL)

( * ) Notice: Subject to any disclaimer, the term of this patent is extended or adjusted under 35 U.S.C. 154(b) by 0 days.

(21) Appl. No.: 16/341,401

(22) PCT Filed: Oct. 10, 2017

(86) PCT No.: PCT/NL2017/050666
§ 371 (c)(1),
(2) Date: Apr. 11, 2019

(87) PCT Pub. No.: WO2018/070869
PCT Pub. Date: Apr. 19, 2018

(65) Prior Publication Data
US 2020/0038765 A1 Feb. 6, 2020

(30) Foreign Application Priority Data
Oct. 11, 2016 (NL) ........................... 2017609

(51) Int. Cl.
*A63F 13/92* (2014.01)
*A63F 13/235* (2014.01)
*A63F 13/24* (2014.01)
*A63F 13/28* (2014.01)

(52) U.S. Cl.
CPC ............ *A63F 13/92* (2014.09); *A63F 13/235* (2014.09); *A63F 13/24* (2014.09); *A63F 13/28* (2014.09)

(58) Field of Classification Search
CPC ......... A63F 13/12; A63F 13/34; G01S 5/0027
See application file for complete search history.

(56) References Cited

U.S. PATENT DOCUMENTS 5,125,669 A * 6/1992 Kanda .................. A63B 67/068
 273/118 R
8,257,177 B1 9/2012 Saund et al.
(Continued)

OTHER PUBLICATIONS

International Search Report and Written Opinion for International Application No. PCT/NL2017/050666 dated Jan. 22, 2018.

*Primary Examiner* — David L Lewis
*Assistant Examiner* — Robert E Mosser
(74) *Attorney, Agent, or Firm* — Troutman Pepper Hamilton Sanders LLP; Ryan A. Schneider

(57) ABSTRACT

A portable interactive game unit including a housing at least partially enclosing a power supply, a feedback generator for providing at least one of an auditory feedback signal, a tactile feedback signal and a visual feedback signal, a controller including at least a processor and a memory for storing at least a representation of a game scenario, and a wireless inter-device communication module for communicating with another game unit, wherein in operation the processor calculates at least one game parameter based on a signal of the wireless inter-device communication module using the representation of the game scenario and a performance dependent parameter.

17 Claims, 6 Drawing Sheets

(56) References Cited

U.S. PATENT DOCUMENTS

| | | | |
|---|---|---|---|
| 8,574,049 B1 * | 11/2013 | Ackerman | A63B 67/00 463/7 |
| 2002/0198055 A1 | 12/2002 | Bull et al. | |
| 2009/0286607 A1 * | 11/2009 | Rosica | G07F 17/32 463/42 |
| 2012/0329538 A1 | 12/2012 | Hall | |

* cited by examiner

PORTABLE INTERACTIVE GAME UNIT AND A COMPUTER-IMPLEMENTED METHOD FOR A PORTABLE INTERACTIVE GAME UNIT

TECHNICAL FIELD

The present disclosure relates to a portable interactive game unit. The invention also pertains to a computer-implemented method for a portable interactive game unit and to a method for exercising using such a portable interactive game unit.

BACKGROUND

It is known to utilise digital devices such as PDAs, tablet computers or mobile phones to play games or interact with other players. It is also known to use these devices for outdoor games. However, screen-based games are not in all cases beneficial, in particular not for children and adolescents. It is also known to utilise digital devices without screens to promote outdoor play and to stimulate children to perform physical activities while playing with each other. Such devices usually comprise feedback means for providing some feedback to users and may indicate a distance with respect to another user, beacon or the like.

A disadvantage of the known portable interactive game units, is that the game play is equal for all players. Although in many cases this is considered good practise, it does not promote physical activities or perseverance for players with less physical capacities such as e.g. children with a certain degree of obesity, or mixed groups of children of different ages and the like.

SUMMARY

In a first aspect of the present invention, a portable interactive game unit, comprising a housing at least partially enclosing a power supply, a feedback generator for providing at least one of an auditory feedback signal, a tactile feedback signal and a visual feedback signal, and a controller comprising at least a processor and a computer-readable storage medium for storing at least a representation of a game scenario, the game unit further comprising a wireless inter-device communication module for communicating with another game unit, wherein in operation the processor calculates at least one game parameter based on a signal of the wireless inter-device communication module using the representation of said game scenario and a performance dependent parameter.

By providing a portable interactive game unit which utilises a performance dependent parameter to change the game play per individual game unit, the game play of such a portable interactive game unit may be adapted to different levels of physical capabilities and it may thereby promote those physical activities for all users of all levels.

The portable interactive game unit may be specific for a single game or more versatile by incorporating a plurality of selectable games. It may also utilise a computer-readable memory for storing such representations of game scenarios. This computer-readable memory may be reprogrammable and/or be an exchangeable type of memory.

The device may be provided in portable form such that users, and in particular children are able to grab it with ease and run around with it. Depending on the activated game or game scenario, the portable interactive game unit provides a user with a controllable feedback, which can be of an auditory, tactile and/or visual nature. This controllable feedback may be used to provide individual feedback or e.g. to separate a plurality of users into two or more groups or to indicate a specific role for a specific player.

The portable interactive game unit further comprises a controller having at least a processor and a computer-readable storage medium for storing a representation of a game scenario. Such computer-readable storage medium may include a replaceable medium or a fixed medium, such as e.g. a flash memory, ROM or other means. A representation of a game scenario may include specifics about a game, such as rules, or visual, tactile or audible feedback signals associated with specific roles within the game. It may also e.g. include a range of proximity within which a specific game action occurs, such as capturing an imaginary flag when a user is within 1 meter of a flag carrying other player. The representation of a game scenario may also include a timer for counting down the game duration, or comprising a lookup table for specific points to be awarded in specific game play situations.

The device further comprises a wireless inter-device communication module for communicating with other game units, such as other similar portable interactive game units. Suitable inter-device communication modules may be e.g. based on Wi-Fi, Bluetooth or other wireless personal area networks (WPANs) such as ZigBee or ZigBee-like types. ZigBee-type inter-device communication modules operate in accordance with the IEEE 802.15.4 international standard. In general, they may utilise short range radio transmitters and receivers, e.g. to determine relative distance to other play units, beacons or other readable devices.

In operation, the processor calculates at least one game parameter based on a signal of the wireless inter-device communication module using the representation of said game scenario and a performance dependent parameter. Such game parameter may include awarding points, determining a ranking between players or determining whether or not a device is in close (enough) proximation to perform a specific game action, such as capturing a flag, or transferring a game play status from one device to the other proximate device.

The device according to the invention also uses a performance dependent parameter for the calculation of a game parameter. Such performance dependent parameter may include a ranking, or relative ranking between two proximate devices, a measurement of height or any other suitable performance dependent parameter. This performance dependent parameter may be an individual performance dependent parameter or e.g. a team-based or status based performance dependent parameter. It is considered advantageous to determine such performance dependent parameter on a per device basis, such that players using such device benefit from the adaptation of the game play.

For example, if the portable interactive game unit is programmed to facilitate playing a game of tag, and normally users are "caught" or tagged, when another device gets in close range, e.g. 50 centimetres, it may be stimulating to slower players (such as e.g. younger children in the group), to increase that proximity range from 50 centimetres to 2 meter such that it is easier and more rewarding, and thereby stimulating to continue playing and exercising. Other games may have similar or other ways of correcting or adapting the game play.

Such a performance dependent parameter may be measured locally on the device or determined on a remote system, such as a central computer, after which that performance dependent parameter may be communicated back to some of all of the activated devices. The resulting adaptation of the game play may be implemented by adapting the physical ranges of the communication devices itself, e.g. reducing the power of the radio transmitter, or executed by measuring and applying a filter in software.

In an embodiment of the portable interactive game unit according to the invention, the signal of the wireless inter-device communication module is dependent on an inter-device distance or inter-device relative velocity. By measuring an incoming signal or signals of surrounding other devices and comparing e.g. signal strength, an estimation can be made of the proximity of the other devices. By calculating e.g. the first derivative of the distance, an indication for the relative velocity of another device may be derived. In many types of game play it is found useful to determine distance, proximation and/or (relative) velocity of players to determine game play actions. It may also be possible to determine a distance or velocity relative to a central point in the playing field or area, by utilizing e.g. a central shared device which communicates with the surrounding devices. By determining certain distances and/or velocities it is possible to use these measurements or estimations in game play scenarios, for example by comparing them with a certain threshold such as the proximity range as discussed earlier.

In an embodiment of the portable interactive game unit according to the invention, the feedback generator is configured to provide, in operation, an auditory, tactile and visual feedback signal. By combining these types of feedback in a game play scenario, players may receive sound signals, e.g. to indicate the start or finish of the game, tactile feedback, e.g. in the form of vibrations with varying amplitude, frequency, or any other suitable pattern, while the color of their device indicate for which team they currently play, or e.g. how close they are to a specific target by varying the color from blue to e.g. red when proximate to the target.

In an embodiment of the portable interactive game unit according to the invention, the wireless inter-device communication module comprises a short range radio transmitter and receiver. Short range radio systems are suitable for this type of portable interactive game units, as the users of these systems usually play the games in a relative proximity to each other, such as a square, sports field or forest. Typical ranges for the radio systems are e.g. 100-1000 metres. Suitable systems may include a ZigBee-type communication module. Such system is an IEEE 802.15.4 based wireless personal area network devices, although other types of such communication devices may as well be utilised. It may however be appreciated that this type of communication modules use relatively little power, and are not dependent upon satellite communications such as GPS-based types. Satellite based versions may be less suitable in indoors, mixed indoors and outdoors, or otherwise blocked situations such as overgrown areas.

In an embodiment of the portable interactive game unit according to the invention, the performance dependent parameter is dependent on a relative inter-device ranking based on the representation of a game scenario. By using the inter-device ranking of a user in a specific game play scenario, said game can be modified based on the actual performance of such user. If a first user outperforms a second player by far, the second player may otherwise be discouraged to continue playing with the associated physical exercise. By weighing e.g. the level of intensity based on the ranking between players, the game remains more interesting and satisfying for all users, even in mixed groups of players, such as mixed age groups of children.

In an embodiment of the portable interactive game unit according to the invention, the performance dependent parameter is used such that a higher relative inter-device ranking results in a more demanding game play. By making the game more demanding for the more successful players, by varying the level of intensity based on the ranking between players, the game remains more interesting and satisfying for all users, even in mixed groups of players, such as mixed age groups of children. In this fashion the successful players must increasingly challenge themselves to remain successful while the e.g. younger or slower players are not too much discouraged to continue playing.

In an embodiment of the portable interactive game unit according to the invention, the feedback generator comprises at least one of a vibration generator for generating a tactile feedback, a light emitting element for controllably generating a visual feedback signal and an audio generator for controllably generating an auditory feedback signal. Such vibration generator may include any suitable vibrator such as a small electric motor with an off-centre mass, which causes vibration when activated. Tactile feedback is a valuable addition to game play e.g. to indicate a role, or indicate the awarding of points. Light may be a valuable addition to a game scenario, e.g. to indicate to which team a player belongs, how far a specific target is located, or as an indication for a ranking or (virtual) energy level of a player. The audio generator, such as e.g. a speaker system, may be used for e.g. emitting noise, music or voice messages.

In an embodiment of the portable interactive game unit according to the invention, the controller is configured to control at least one of a vibration pattern, vibration intensity, light color, light intensity, audio pattern and audio intensity. By differentiating between patterns, intensities and/or color, the game unit is able to indicate several different signals, such as awarding of points, finishing and the like.

In a further embodiment of the portable interactive game unit according to the invention, the controller is configured to control at least one of a color and/or intensity of the light emitting element in response to the representation of a game scenario. By controlling color and/or intensity of the light source of the portable interactive game unit a game developer may introduce visual feedback to a game scenario. Teams with the same color marking, ranking information, energy levels or use as proximation indicator e.g. by increasingly intense light when closer to some target. For players it is an easy to understand indication of specific game play situations even in the situation wherein a player is e.g. running.

In an embodiment of the portable interactive game unit according to the invention, the housing is substantially waterproof. It is considered advantageous to configure the portable interactive game unit, such that it is robust and sturdy enough to enable players, such as children, to play outside even on rough terrain with the devices without the risk of easy breaking or damaging a device. To cope with different weather conditions, the device may be waterproof, or alternatively water-resistant. The exact level of required water-resistance may be dependent upon local legal or normative restrictions which may vary per region or country.

In a second aspect of the present invention, a game system, comprising a plurality of portable interactive game units according to any one of the preceding claims, wherein at least a first and a second portable interactive game unit of the plurality of portable interactive game units are connected to each other.

In a third aspect of the present invention, a computer-implemented method for a portable interactive game unit is provided, the portable interactive game unit comprising:
- a wireless inter-device communication module,
- a computer-readable storage medium having computer-readable program code embodied therewith, and
- a processor, preferably a microprocessor, coupled to the computer-readable storage medium, wherein responsive to executing the computer-readable program code, the processor is configured to perform executable operations comprising:
  - reading a representation of a game scenario from the computer-readable storage medium;
  - calculating at least one game parameter based on a signal of the wireless inter-device communication module using the representation of said game scenario and a performance dependent parameter.

By providing a portable interactive game unit which utilises a performance dependent parameter to change the game play per individual game unit, the game play of such a portable interactive game unit may be adapted to different levels of physical capabilities and thereby promoting those physical activities for all users of all levels.

The portable interactive game unit may be specific for a single game or more versatile by incorporating a plurality of selectable games. It may also utilise a computer-readable memory for storing such representations of game scenarios.

Games may be activated by a user-interface or input means such as buttons, or by external activators such as e.g. RFID-tags for specific games. By storing a plurality of games onto the devices and selectively activating a specific game scenario by means of input features, the device becomes more versatile.

In an embodiment of the computer-implemented method for a portable interactive game unit according to the invention, further comprising a feedback generator in said portable interactive game unit further executing computer-readable program code for providing an auditory feedback signal, a tactile feedback signal and/or a visual feedback signal. By combining these types of feedback in a game play scenario, players may receive sound signals, e.g. to indicate the start or finish of the game, tactile feedback, e.g. in the form of vibrations with varying amplitude, frequency, or any other suitable pattern, while the color of their device indicate for which team they currently play, or e.g. how close they are to a specific target by varying the color from a first color to another when proximate to the target.

In a further aspect of the present invention, a computer program or suite of computer programs is provided, comprising at least one software code portion or a computer program product storing at least one software code portion, the software code portion, when run on a computer system, being configured for executing the method according to the second aspect of the present invention.

In another aspect of the present invention, a method for exercising is provided, comprising the steps of connecting a plurality of portable interactive game units according to the first aspect of the present invention, determining a performance dependent parameter for the plurality of portable interactive game units, which performance dependent parameter is dependent on a relative inter-device ranking based on the representation of a game scenario, adapting at least one game parameter based on the actual determined performance dependent parameter. This performance dependent parameter may be an individual performance dependent parameter or e.g. a team-based or status based performance dependent parameter. By using the inter-device ranking of a user in a specific game play scenario, said game can be modified based on the actual performance of such user. If a first user outperforms a second player by far, the second player may otherwise be discouraged to continue playing with the associated physical exercise. By weighing e.g. the level of intensity based on the ranking between players, the game remains more interesting and satisfying for all users, even in mixed groups of players, such as mixed age groups of children. By making the game more demanding for the more successful players, by varying the level of intensity based on the ranking between players, the game remains more interesting and satisfying for all users, even in mixed groups of players, such as mixed age groups of children. In this fashion the successful players must increasingly challenge themselves to remain successful while the e.g. younger or slower players are not too much discouraged to continue playing.

In an embodiment of the method for exercising according to the invention, one of said plurality of portable interactive game units generates a variant feedback signal, which is different from the feedback signals on the other portable interactive game units and wherein the variant feedback signal travels from one portable interactive game unit to another portable interactive game unit in case the other portable interactive game unit is within a predetermined proximity range and wherein the predetermined proximity range is dependent on a performance dependent parameter. The game scenario may include assigning specific flags to one or more of the devices. This may be e.g. a status which must be defended in a game, such as a flag, or be a status which must be passed to another player in order to win the game. For example, if the portable interactive game unit is programmed to facilitate playing a game of tag, and normally users are "caught" or tagged, when another device gets in close range, e.g. 50 centimetres, it may be stimulating to slower players (such as e.g. younger children in the group), to increase that proximity range from 50 centimetres to 2 meter such that it is easier and more rewarding, and thereby stimulating to continue playing and exercising. Other games may have similar or other ways of correcting or adapting the game play. Such a performance dependent parameter may be measured locally on the device or determined on a remote system, such as a central computer, after which that performance dependent parameter may be communicated back to some of all of the activated devices.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Functions described in this disclosure may be implemented as an algorithm executed by a processor/microprocessor of a computer. Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples of a computer-readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer-readable storage medium may be any tangible medium that can contain, or store, a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying schematical drawings which are given by way of illustration only, and thus are not limitative of the present invention, and wherein.

DETAILED DESCRIPTION OF EMBODIMENTS

Figure 1:
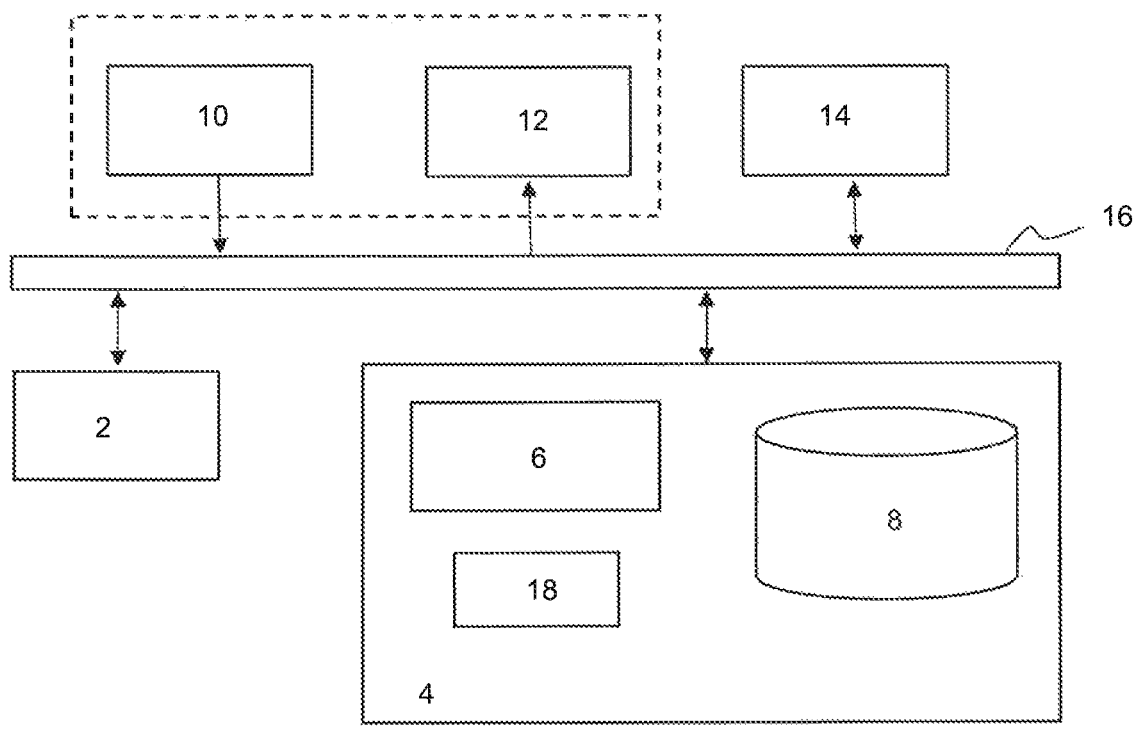
FIG. 1 depicts a computing system as comprised in the portable interactive game unit, according to an embodiment of the invention.

The present invention will now be described with reference to the accompanying drawings, wherein the same reference numerals have been used to identify the same or similar elements throughout the several views.

It is noted that the drawings are schematic, not necessarily to scale and that details that are not required for understanding the present invention may have been omitted. The terms "upward", "downward", "below", "above", and the like relate to the embodiments as oriented in the drawings, unless otherwise specified. The use of such terms should in no way understood such as to have a limiting effect on the scope of the present invention. Further, elements that are at least substantially identical or that perform an at least substantially identical function are denoted by the same numeral, where helpful individualised with alphabetic suffixes.

FIG. 1 schematically illustrates a block diagram illustrating an exemplary data processing system that may be used in a portable interactive game unit as described with reference to FIGS. 2-3.

As shown in FIG. 1, the data processing system 1 may include at least one processor 2 coupled to memory elements 4 through a system bus 16. As such, the data processing system may store program code within memory elements 4. Further, the processor 2 may execute the program code accessed from the memory elements 4 via a system bus 16. In one aspect, the data processing system may be implemented as a computer that is suitable for storing and/or executing program code. It should be appreciated, however, that the data processing system 1 may be implemented in the form of any system including a processor and a memory that is capable of performing the functions described within this specification.

The memory elements 4 may include one or more physical memory devices such as, for example, local memory 6 and one or more bulk storage devices 8. The local memory may refer to random access memory or other non-persistent memory device(s) generally used during actual execution of the program code. A bulk storage device may be implemented as a hard drive or other persistent data storage device. The processing system 1 may also include one or more cache memories (not shown) that provide temporary storage of at least some program code in order to reduce the number of times program code must be retrieved from the bulk storage device 8 during execution.

Input/output (I/O) devices depicted as an input device 10 and an output device 12 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 1 with a dashed line surrounding the input device 10 and the output device 12). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 14 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1, and a data transmitter for transmitting data from the data processing system 1 to said systems, devices and/or networks. Modems, cable modems, and Ethernet cards are examples of different types of network adapter that may be used with the data processing system 1.

As pictured in FIG. 1, the memory elements 4 may store an application 18. In various embodiments, the application 18 may be stored in the local memory 6, the one or more bulk storage devices 8, or apart from the local memory and the bulk storage devices. It should be appreciated that the data processing system 1 may further execute an operating system (not shown in FIG. 1) that can facilitate execution of the application 18. The application 18, being implemented in the form of executable program code, can be executed by the data processing system 1, e.g., by the processor 2. Responsive to executing the application, the data processing system 1 may be configured to perform one or more operations or method steps described herein.

Figure 2:
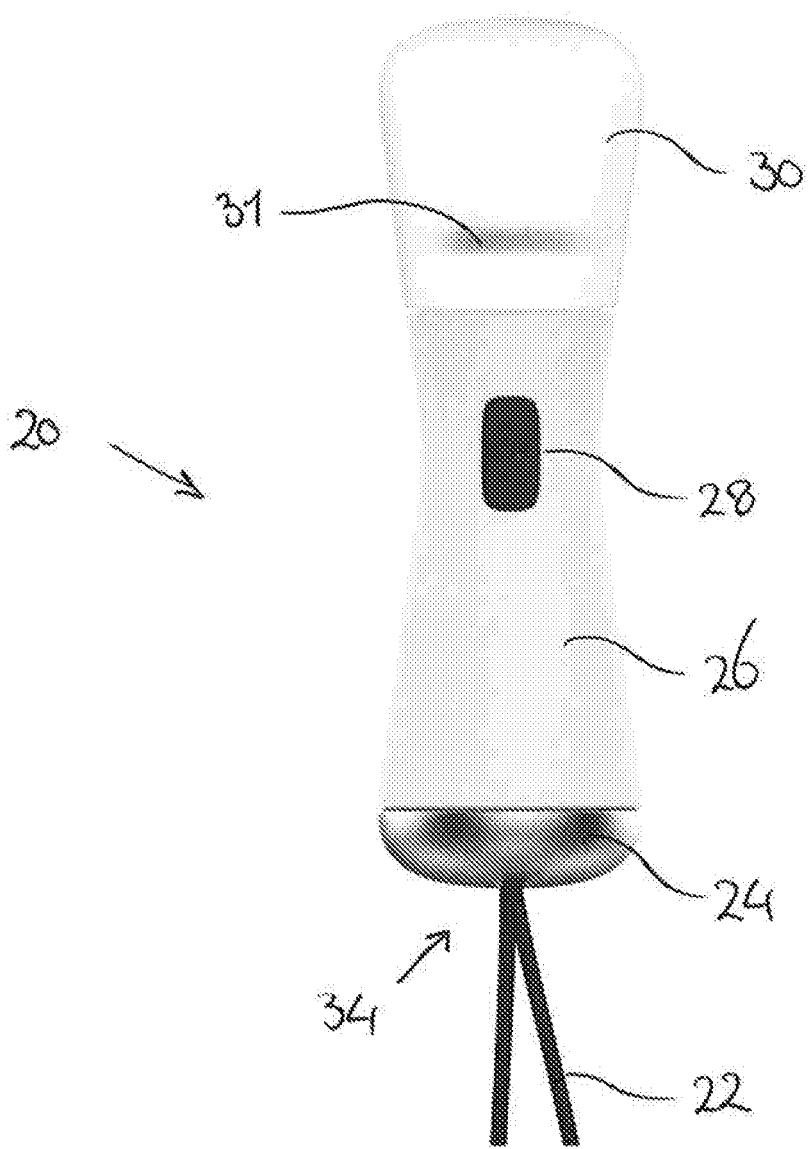
FIG. 2 is a schematic front view of an embodiment of a portable interactive game unit according to the invention.

FIG. 2 schematically illustrates a schematic front view of an embodiment of a portable interactive game unit according to the invention. The portable interactive game unit 20 comprises a strap 22, which is robustly attached to the base cover 24. The base cover 24 is attached to the main housing 26 by means of a screw cap connection. Main housing 26 has been fit with a power button 28 which switches power on or off. The top of the housing is a translucent top cover 30, which enables a light source to emit light through the top part of the housing. Inside the housing a vibration generator (not shown) has been mounted for controllably providing a tactile feedback signal.

Figure 3:
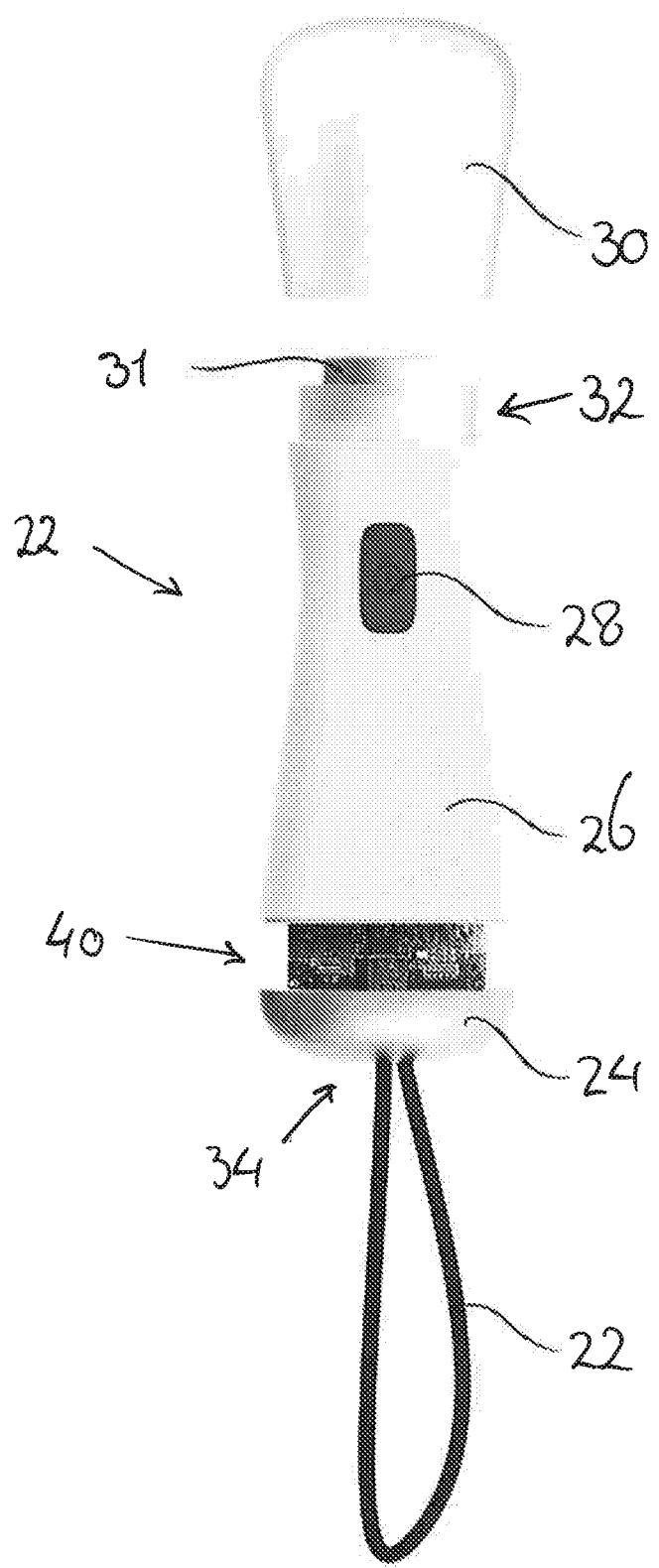
FIG. 3 is a schematic exploded front view of an embodiment of a portable interactive game unit according to the invention.

FIG. 3 schematically illustrates a schematic exploded front view of an embodiment of a portable interactive game unit according to the invention. The exploded view shows a printed circuit board 40 which comprises several electronic components, such as a data processing system 1 as depicted in FIG. 1, having a processor, a flash memory and several communication means, amongst which a ZigBee radio unit for communicating with other similar play units and e.g. an RFID module which is used to read RFID tags. These tags activate a specific game scenario which are stored on an internal memory. The back of the unit comprises a SD-slot for inserting an SD-type memory card for interacting and transferring data to and from the unit. The RFID reader may also be incorporated in game scenarios, e.g. by scanning items which are distributed over the play area and which are fitted with a RFID tag. The printed circuit board also comprises communication means for communicating with other devices such as tablet computers or smart phones, to enable interactions or game control via apps.

The exploded view further shows more detail of light source 32 which shines light through top cover 30. Reflector 31 reflects light towards the outside. The light source comprises multiple LEDs such that the controller can controllably select a specific color of light to emit. The portable interactive game unit 22 also comprises a speaker 34 embedded in the base cover 24, which controllably emits sound. In an alternative embodiment the base cover also incorporates a microphone for a two-way auditory communication.

Figure 4A:
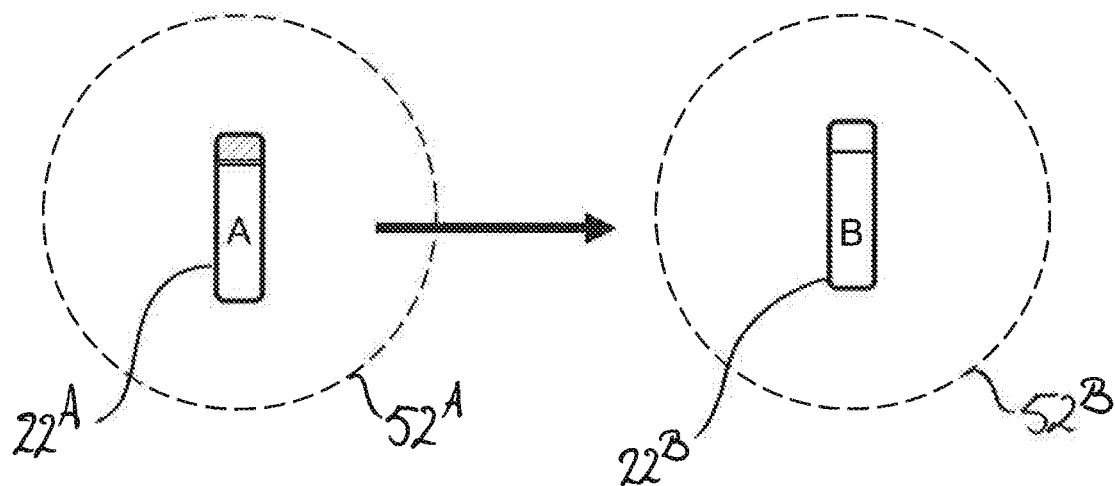
FIG. 4A-4E illustrate a schematic adaptive game scenario using a plurality of portable interactive game units according to the invention.
Figure 4B:
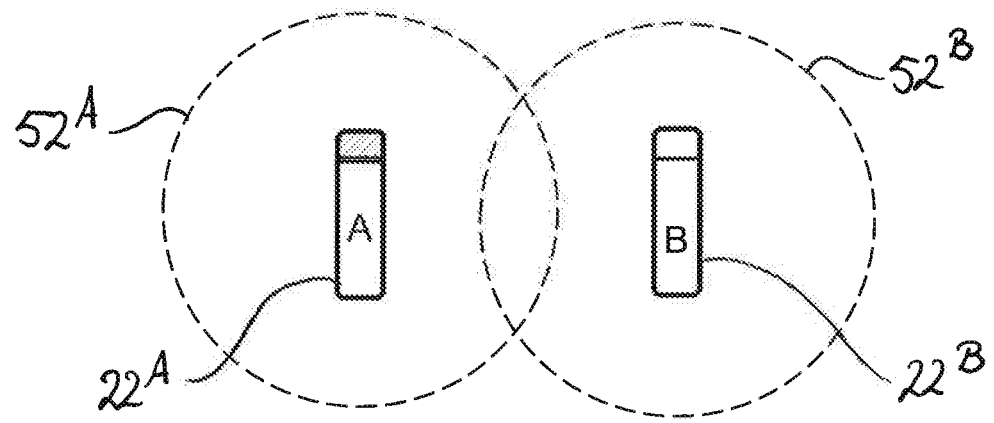
Figure 4C:
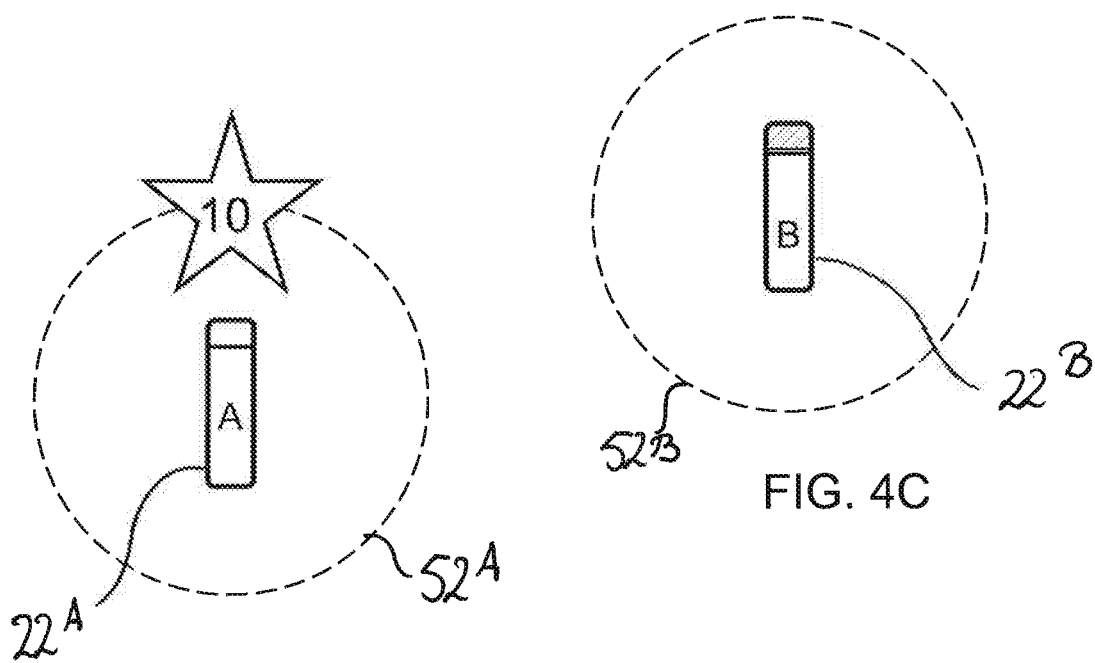

FIGS. 4A-4E depict a schematic adaptive game scenario using a plurality of portable interactive game units according to the invention. In FIG. 4A portable interactive game unit 22A and 22B are playing a game scenario. In this scenario player A must try to "tag" player B. This is indicated by means of a red light, which is emitted by game unit 22A (indicated by the shaded top of unit 22A). If his device 22A comes in close proximity with player B, in particular within the predetermined range 52A, 52B of the devices, the portable interactive game unit 22A stops emitting red light, while the other game unit 22B starts shining red. Tagging other players renders points to the player who tags the other one. The proximity of the game units are measured by the controller based on the strength of the radio signal emitted by the other players. In FIG. 4B the situation is depicted wherein player A is indeed within the predetermined range 52B of player B. FIG. 4C indicates awarding 10 points to player A, after which the light of player A is off and player B gets the red light and the game continues.

Figure 4D:
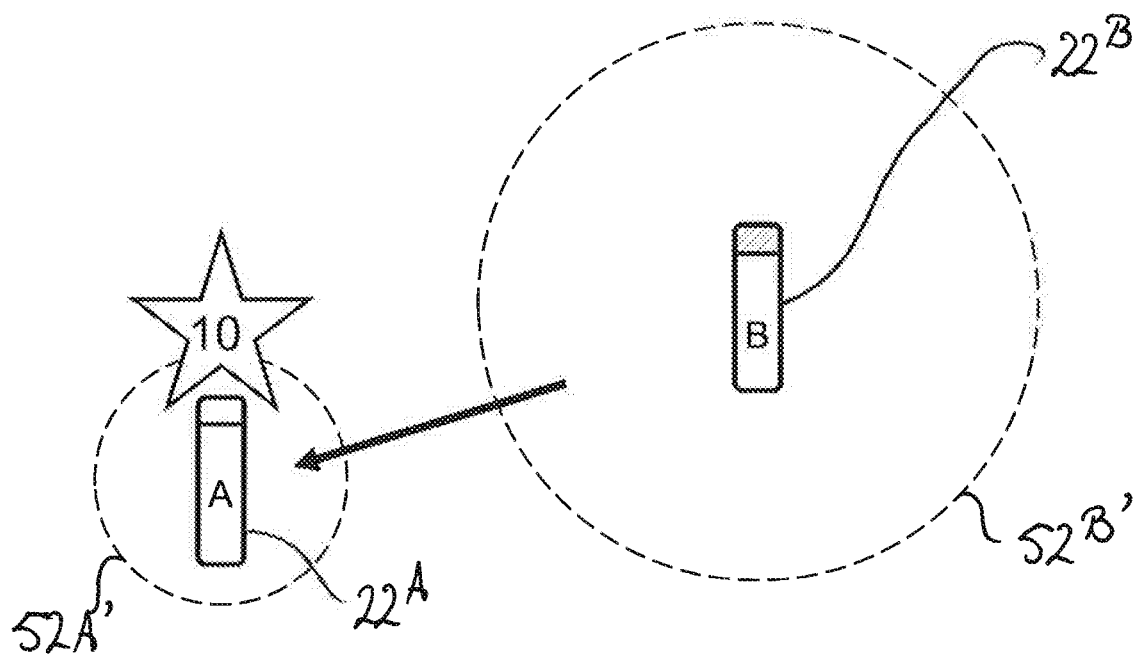

As indicated in FIG. 4D, due to the fact that the ranking of player A is now higher than the ranking of player B, i.e. player A has 10 points, the range 52B' of player B is now bigger than the range 52A' of player A due to the calculation of the performance depending parameter.

Figure 4E:
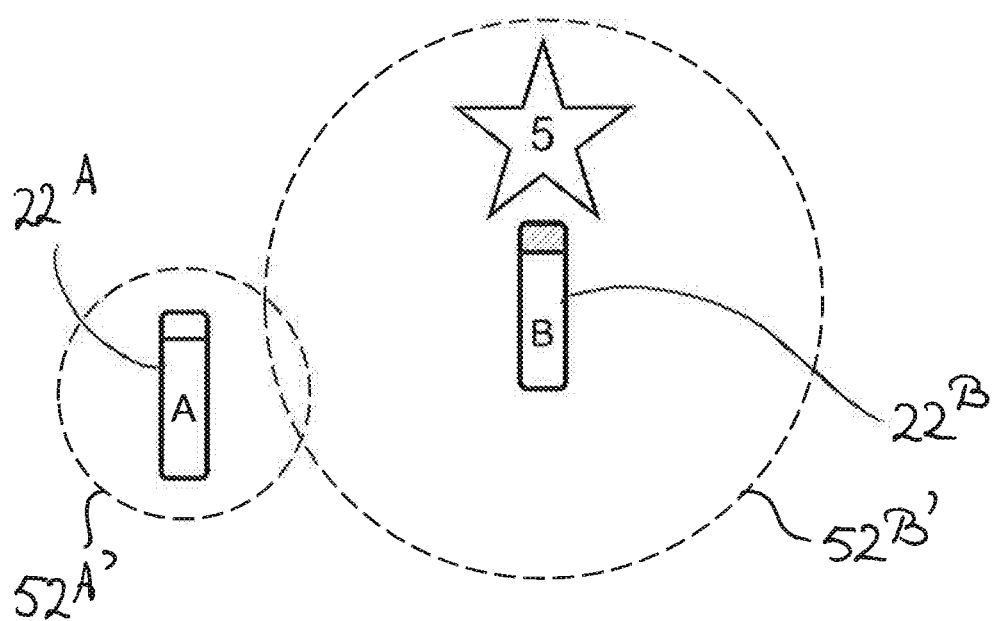

As shown in FIG. 4E, when the (enlarged) range 52B' of player B intersects with the (shrunken) range 52A' of player A, player B is awarded 5 points. In this scenario a bit less than the first tag as the points are made dependent of the size of the range. This motivates both players to continue playing tag and running around while playfully having an exercise.

Various embodiments may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer-readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. A plurality may also indicate a subset of two or more, out of a larger multitude of items. The term another, as used herein, is defined as at least a second or more. The terms including and/or having, as used herein, are defined as comprising (i.e., open language). The term coupled, as used herein, is defined as connected, although not necessarily directly.

Elements and aspects discussed for or in relation with a particular embodiment may be suitably combined with elements and aspects of other embodiments, unless explicitly stated otherwise. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for exercising comprising:
   connecting two or more portable interactive game units, each portable interactive game unit comprising:
   a housing configured to at least partially enclose a power supply;
   a feedback generator configured to provide at least one of an auditory feedback signal, a tactile feedback signal and a visual feedback signal;
   a controller comprising:
     a processor; and
     a computer-readable storage medium for storing at least a representation of a game scenario; and
   a wireless inter-device communication module for communicating with another portable interactive game unit;
   wherein the signal is configured to calculate at least one game parameter based on a signal of the wireless inter-device communication module using the representation of the game scenario and a performance dependent parameter;
   determining the performance dependent parameter for one or more of the portable interactive game units, which performance dependent parameter is dependent on a relative inter-device ranking based on the representation of the game scenario; and
   adapting at least one game parameter based on the actual determined performance dependent parameter;
   wherein one of the portable interactive game units generates a variant feedback signal, which is different from the feedback signals on the other portable interactive game units;
   wherein the variant feedback signal travels from one portable interactive game unit to another portable interactive game unit in case the other portable interactive game unit is within a predetermined proximity range; and
   wherein the predetermined proximity range is dependent on the performance dependent parameter.

2. The method for exercising according to claim 1, wherein the housing is substantially waterproof.

3. The method for exercising according to claim 1, wherein the feedback generator is configured to provide each of the auditory feedback signal, the tactile feedback signal and the visual feedback signal.

4. The method for exercising according to claim 3, wherein the feedback generator comprises:
   a vibration generator for generating the tactile feedback signal;
   a light emitting element for controllably generating the visual feedback signal; and
   an audio generator for controllably generating the auditory feedback signal.

5. The method for exercising according to claim 1, wherein the wireless inter-device communication module comprises:

a short-range radio transmitter; and a receiver.

6. The method for exercising according to claim 1, wherein the performance dependent parameter is used such that a higher relative inter-device ranking of a game unit results in a more demanding game play of that game unit.

7. The method for exercising according to claim 6, wherein the performance dependent parameter is further used such that a lower relative inter-device ranking of a game unit results in a less demanding game play of that game unit.

8. The method for exercising according to claim 1, wherein the performance dependent parameter is used such that a lower relative inter-device ranking of a game unit results in a less demanding game play of that game unit.

9. A portable interactive game unit comprising:

a substantially waterproof housing configured to at least partially enclose a power supply;

a feedback generator configured to provide each of an auditory feedback signal, a tactile feedback signal and a visual feedback signal, the feedback generator comprising:
  a vibration generator for generating the tactile feedback signal;
  a light emitting element for controllably generating the visual feedback signal; and
  an audio generator for controllably generating the auditory feedback signal;

a controller configured to control at least one of a vibration pattern, vibration intensity, light color, light intensity, audio pattern and audio intensity, the controller comprising:
  a processor; and
  a computer-readable storage medium for storing at least a representation of a game scenario; and a wireless inter-device communication module for communicating with another game unit comprising:
  a short-range radio transmitter; and
  a receiver;

wherein the processor is configured to calculate at least one game parameter based on a signal of the wireless inter-device communication module using the representation of the game scenario and a performance dependent parameter;

wherein the signal of the wireless inter-device communication module is dependent on an inter-device distance or inter-device relative velocity;

wherein the performance dependent parameter is dependent on a relative inter-device ranking based on the representation of the game scenario; and wherein the performance dependent parameter is used such that a higher relative inter-device ranking of a game unit results in a more demanding game play of that game unit.

10. The portable interactive game unit according to claim 9, wherein the performance dependent parameter is further used such that a lower relative inter-device ranking of a game unit results in a less demanding game play of that game unit.

11. A game system comprising:

a first portable interactive game unit according to claim 9; and a second portable interactive game unit according to claim 9;

wherein the first and second portable interactive game units are connected to each other.

12. The game system according to claim 11, wherein one of the portable interactive game units generates a variant feedback signal, which is different from the feedback signals on the other portable interactive game unit.

13. The game system according to claim 12, wherein the variant feedback signal travels from one portable interactive game unit to the other portable interactive game unit in case the other portable interactive game unit is within a predetermined proximity range.

14. The game system according to claim 13, wherein the predetermined proximity range is dependent on the performance dependent parameter.

15. The portable interactive game unit according to claim 9, wherein the representation of the game scenario comprises one or more specifics of a game played with the game unit; and wherein the performance dependent parameter is further used to change the game play demand providing a game unit that adapts to different levels of capabilities of a user of the game unit.

16. The portable interactive game unit according to claim 15, wherein the capabilities of the user of the game unit are physical capabilities of the user; and wherein changing the game play demand promotes different levels of physical activity for the user based upon the user's physical capabilities.

17. The portable interactive game unit according to claim 9, wherein the processor is further configured to adapt at least one game parameter based on the performance dependent parameter.

* * * * *